United States Patent [19]

Lee

[11] Patent Number: 6,115,431

[45] Date of Patent: Sep. 5, 2000

[54] PHASE DETECTING METHOD AND PHASE TRACKING LOOP CIRCUIT FOR A DIGITAL VESTIGIAL SIDEBAND MODULATION COMMUNICATION DEVICE

[75] Inventor: Myeong-Hwan Lee, Suwon, Rep. of Korea

[73] Assignee: Samsung Electronics Co., Ltd., Kyungki-do, Rep. of Korea

[21] Appl. No.: 08/942,788

[22] Filed: Oct. 2, 1997

Related U.S. Application Data

[63] Continuation-in-part of application No. 08/634,416, Apr. 18, 1996, Pat. No. 5,933,460.

[30] Foreign Application Priority Data

Apr. 19, 1995 [KR] Rep. of Korea ........................ 9259/95

[51] Int. Cl.$^7$ .............................. H04L 27/22; H04L 27/14
[52] U.S. Cl. .......................... 375/324; 375/326; 375/329; 375/344; 329/304
[58] Field of Search ..................................... 375/324, 326, 375/344, 340, 329, 332, 321, 371, 373, 376, 270, 279, 280, 281, 277; 329/304, 307; 348/536, 537, 725, 726, 607

[56] References Cited

U.S. PATENT DOCUMENTS

| 5,406,587 | 4/1995 | Horwitz et al. ........................... 375/344 |
| 5,533,070 | 7/1996 | Krishnamurthy et al. ............... 375/346 |
| 5,533,071 | 7/1996 | Krishnamurthy et al. ............... 375/346 |
| 5,602,601 | 2/1997 | Kim et al. ................................ 375/340 |
| 5,796,786 | 8/1998 | Lee .......................................... 375/326 |
| 5,933,460 | 8/1999 | Lee .......................................... 375/324 |

*Primary Examiner*—Stephen Chin
*Assistant Examiner*—Betsy L. Deppe
*Attorney, Agent, or Firm*—Sughrue, Mion, Zinn, Macpeak & Seas, PLLC

[57] ABSTRACT

A phase detecting method and associated apparatus for use in a digital vestigial sideband modulation communication device. The phase detecting method has the steps of: digital-filtering I channel data applied from the exterior to restore Q channel data; compensating for a phase of the I and Q channel data by a prescribed phase error value; estimating an I channel level value which approximates the I channel data from the phase-compensated I channel data; and obtaining a difference between the phase-compensated I channel data and the estimated I channel level value, and generating as the phase error value an operation value obtained by multiplying the difference by a sign of the Q channel data.

4 Claims, 8 Drawing Sheets

PHASE DETECTING METHOD AND PHASE TRACKING LOOP CIRCUIT FOR A DIGITAL VESTIGIAL SIDEBAND MODULATION COMMUNICATION DEVICE

This is a Continuation-in-Part of application Ser. No. 08/634,416 filed Apr. 18, 1996 now U.S. Pat. No. 5,933,460, issued Aug. 3, 1999.

BACKGROUND OF THE INVENTION

1. Field of the Invention

The present invention relates to a demodulator of a digital modulation communication system, and more particularly to a phase tracking loop (PTL) circuit and a phase detecting method for detecting a phase of a signal received from the demodulator to perform a data communication using a digital vestigial sideband (VSB) modulation.

The present application for a demodulator of a digital modulation system, is based on Korean Application No. 9250/1995 which is incorporated herein by reference for all purposes.

2. Description of the Related Art

Since the advent of television, a realistic ambience, a large-sized screen and increased resolution have been sought. To achieve these ends, Japan is instituting the first high definition television (HDTV) broadcasting based on an analog transmission system. Such a system is called "Multiple Sub-Nyquist Sampling Encoding (MUSE)" transmission system. In the United States, a VSB transmission system. In the United States, a VSB modulation system has been proposed and adopted as a modulating method of a HDTV system by a GA (Grand Alliance) Committee. The VSB modulation system is used as a modulating technique of an analog video signal in conventional TV broadcasting, and utilized to transmit a digital modulation signal in GA-HDTV. In initial digital spectrum compatible (DSC) HDTV, 2-VSB and 4-VSB, respectively using 2 and 4 levels, are selected as the modulating method. In the GA HDTV, however, 8-VSB using 8 levels and 16-VSB using 16 levels applied to a high speed cable mode are selected as the modulating method. In order to demodulate VSB signals, the GA committee has proposed a schematic structure of a VSB receiver. The proposed VSB receiver of the HDTV has the following features. First, the proposed VSB receiver performs sampling by the unit of a symbol rate, unlike other demodulators of a digital modulating signal, by detecting data using only a signal of an I (in-phase) channel. Hence the VSB receiver has a simple structure in comparison with a quadrature amplitude modulation (QAM) receiver, for example, simultaneously using a Q (quadrature) channel. Furthermore, even though a processing speed is relatively lower than a fractional rate receiver, data detection is possible because the data is processed by the symbol rate.

The proposed VSB receiver uses synchronous coherent detection for demodulating a carrier wave from the receiver to detect digital data from a modulating signal. Although the synchronous coherent detection has an advantage in that it is possible to detect data with a lower error rate than asynchronous coherent detection at the same signal-to-noise ratio, the structure of the receiver is more complicated due to a carrier wave restoring circuit. Therefore, in order to detect a phase of a transmitting signal for the synchronous coherent detection, the proposed VSB receiver is constructed with 2 stages using a frequency and phase locked loop (FPLL) and a phase tracker.

The FPLL estimates the phase of the transmitting signal using a pilot signal contained in the VSB signal. The FPLL can be easily constructed by a frequency error detecting circuit of a conventional phase locked loop (PLL) and is disclosed in GA HDTV system specifications. An output of the FPLL is supplied to an input of a PTL circuit after passing through a channel equalizer. The PTL circuit eliminates the noise of a phase which is not eliminated in the FPLL, that is, a phase error. The PTL circuit of the GA HDTV receiver is not very different in structure from a decision directed carrier recovery (DDCR) circuit. However, the PTL circuit compensates for an error value of the phase after estimating a rotary component of signal points using sampled data of an input I channel. Information to be actually transmitted is contained in data of the I channel. Although the Q channel does not have an actual information transmitting function, it reduces the spectrum of a modulating signal. If there is a phase error during demodulation, a signal of the Q channel as well as data of the I channel is contained in the sampling data of the I channel. Accordingly, information of the Q channel is also needed to correct the phase error of the PTL circuit. The information of the Q channel can easily be obtained by filtering the data of the I channel by a Hilbert transform filter.

FIG. 1 shows a GA HDTV receiver proposed as a standard system by the GA committee. A schematic operation of a VSB receiver shown in FIG. 1 is disclosed in a collection of papers of a synthetic science meeting of The Korea Telecommunications Society, of Autumn 1994, entitled "DESIGN AND PERFORMANCE ANALYSIS OF A PHASE TRACKER FOR A SYNCHRONOUS VSB RECEIVER".

Referring to FIG. 1, the operation of the VSB receiver proposed by the GA committee will be explained hereinafter. First, a signal received from an antenna is supplied to a tuner 10. An equivalent band-pass VSB signal y(t) of an output signal generated from the tuner 10 can be represented by the following equation (1):

$$y(t) = \bar{\chi}(t) e^{j\omega_c t + \theta(t)} \quad (1)$$

where $\omega_c$ is a frequency of a carrier wave, $\theta(t)$ is a phase of the carrier wave, and $\bar{\chi}(t)$ is a complex low-pass filtering signal. $\bar{\chi}(t)$ consists of a real number component and an imaginary number component, and can be represented by the following equation (2):

$$\bar{\chi}(t) = \chi_y(t) + j\chi_a(t) \quad (2)$$

A FPLL 20 restores a carrier wave $e^{j\omega_c t}$ using a pilot signal contained in the equivalent band-pass VSB signal outputted from the tuner 10. The FPLL 20 multiplies the carrier wave $e^{j\omega_c t}$ by the equivalent band-pass VSB signal and converts the multiplied signal to a baseband signal. The converted signal is expressed as the following equation (3):

$$i(t) = \chi_y(t) \cos(\theta[n]) - \chi_a(t) \sin(\theta[n]) \quad (3)$$

A Q channel component is given by:

$$q(t) = \chi_y(t) \sin(\theta[n]) + \chi_a \cos(\theta[n]) \quad (4)$$

In the above equations (3) and (4), $\theta[n]$ is a phase error value estimated by the FPLL 20. There is a vestigial phase component caused by a phase error between the carrier wave of a received signal and the restored carrier wave. The vestigial phase component distorts a demodulating signal. In the VSB receiver proposed by the GA committee, only a signal of the I channel is used. A symbol timing recovery circuit (STR) 40 receives the output signal i(t) of the FPLL 20 and restores symbol timing to control the operation timing of an analog-to-digital (A/D) converter 30. The A/D converter 30 converts the output signal i(t) of the FPLL 20 to a digital signal Î[nt] according to a symbol interval rate under the control of the STR 40. The digital signal Î[nT] is supplied through an equalizer 50 to a PTL 60. An output of the equalizer 50 can be given by the following equation (5) [in the above equations N indicates a fixed number]:

$$\hat{I}[nT]e^{jw_c[nT]} = I[n]e^{jw_c[n]} = \chi_y[n] \cos(\theta[n]) - \chi_i[n] \sin(\theta[n]) \quad (5)$$

where it can be assumed that a variation in θ (hereinafter [n] is omitted to simplify the description) is sufficiently slow. Therefore, θ[n] has a constant value during a few symbol time. The equation (5) shows an I phase component of a signal demodulated to the carrier wave in which the phase error is θ[n]. This signal is supplied to the PTL 60 through the equalizer 50. The PTL 60 estimates the phase error θ to compensate for this value.

In the VSB modulation system, since $\chi_y$ and $\chi_i$ have non-zero values, the phase error θ can not be estimated only by the I channel signal expressed by the equation (5). Hence, a Q channel signal is needed to estimate the phase error θ. However, since the I channel signal is used as an input of the PTL 60, the PTL 60 estimates the Q channel component of the equation (4) from the I channel component signal through a digital filter.

FIG. 2 shows a block diagram of the PTL 60 according to the prior art. A digital filter 63, a Hilbert transform filter, digital-filters I data generated from a multiplier 61 to generate a restored signal Q' of the Q signal. The relationship between the I channel component and the Q channel component of an actual low-pass VSB signal is as follows:

$$\chi_y * h_{vbs} = \chi_i \quad (6)$$

where $h_{vsb}$ is equal to a response to a Hilbert transformer and a high-pass filter which are serially connected. The high-pass filter causes a vestigial sideband to exist in the spectrum of the VSB modulating signal. In the spectrum of the VSB signal adopted in the GA HDTV, the vestigial sideband is 0.31 MHz, and a band at a baseband of the VSB signal is 5.59 MHz. It is therefore apparent that the vestigial sideband occupies a very minute region. It is judged that there is no great error even though the spectrum of the VSB signal approximates the spectrum of a single sideband (SSB) signal. In such a case, $h_{vsb}$ approximates a Hilbert transform $h_H$. Since the Hilbert transform phase-shifts a signal by 90°, the relationship between $\chi_y$ and $\chi_i$ is as follows:

$$\chi_y * h_H = \chi_i \quad (7)$$

$$\chi_i * h_H = -\chi_y \quad (8)$$

If a variation in the I signal of the equation (5) is very slow relative to a variation in θ, the following equations are satisfied:

$$\chi_y \cos\theta * h_H = \chi_i \cos\theta \quad (9)$$

$$\chi_i \sin\theta * h_H = -\chi_y \sin\theta \quad (10)$$

Consequently, the following result is obtained:

$$I * h_H = \chi_i \cos\theta + \chi_y \sin\theta = Q \quad (11)$$

In the phase detecting structure of the PTL 60, the relationship between an actually transmitted signal $\chi_y + j\chi_i$ and a signal I+jQ containing the phase error is as follows:

$$(\chi_y + j\chi_i)e^{j\omega c} = I + jQ \quad (12)$$

When expanding the above equation (12) for θ[n], then $$\cos\theta + j\sin\theta = \frac{(I + jQ)(\chi_y - j\chi_i)}{\chi_y^2 + \chi_i^2} \quad (13)$$

In the above equation (13), when expanding only an imaginary part, then $$\sin\theta = \frac{\chi_y Q - \chi_i I}{\chi_y^2 + \chi_i^2} \quad (14)$$

If θ is small, the phase error is given by:

$$\theta \approx \sin\theta = \frac{\chi_y Q - \chi_i I}{\chi_y^2 + \chi_i^2} \quad (15)$$

However, since a receiving side does not know real values of $\chi_y$ and $\chi_i$, an estimated value is used.

That is, in the equation (15), if θ is small, the I channel signal approximates to a value of $\chi_y$. Hence, the I channel signal is used as the estimated value of $\chi_y$. When squaring and adding the equations (5) and (11), then $$I^2 + Q^2 = \chi_y^2 + \chi_i^2 \quad (16)$$

The estimated value $\hat{\chi}_i$ of $\chi_i$ is obtained by the following equation (17):

$$\hat{\chi}_i = \pm\sqrt{I^2 + Q^2 - \hat{\chi}_y} \quad (17)$$

From the equation (17), if θ is small, since Q approximates to $\chi_i$, $\hat{\chi}_i$ is selected so as to have the same sign as the Q. That is, $$\hat{\chi}_y = \hat{I} \quad (18)$$

$$\hat{I}_i = sgn(Q) * \sqrt{I^2 + Q^2 - \hat{\chi}_y} \quad (19)$$

The expression of the phase error becomes the equation (15). A phase error signal is obtained using the equation (15) and accumulated in an accumulator 67. A sine and cosine table ROM (read-only memory) 68 supplies sine and cosine values corresponding to an average value of the accumulated phase error signal to a complex multiplier 65 and eliminates a vestigial phase component by repeating the above process. The most important factor determining the performance of the PTL 60 is a method for detecting a phase difference between the input signal and the output signal of the PTL 60.

The above-described phase tracking loop circuit has a shortcoming in that there is an untrue assumption in the phase detecting algorithm. Moreover, since only the I value is used to determine $\chi_y$, a linear operating range of phase detection is limited according to a determined error, resulting in performance deterioration. Further, although an accumulation limited value is multiplied by the input signal (i.e., the I data) to compensate for amplitude distortion caused by the vestigial phase, the amplitude compensation incorporates a delay for an actual error due to the delay of the digital filter 63.

An example of another phase tracking loop circuit for overcoming these problems is disclosed in Korea Patent Application No. 95-5265, assigned to the same assignee as the present invention. In the above Patent Application No. 95-5265, the phase error is detected by the following equations (20) and (21). FIG. 3 is a scattering line diagram for an input signal of the phase tracking loop circuit disclosed in the above Patent Application No. 95-5265.

$$\theta = ATAN\left(\frac{I_e}{Q''}\right) \quad (20)$$

$$I_e = I'' - \hat{I} \quad (21)$$

Whereas only I" is used to obtain $I_c$ in FIG. 2, the above Patent Application No. 95-5265 uses I" and Q" as shown in FIG. 3. That is, $I_c$ is determined by calculating a slope indicated by an oblique line. While a fixed determining region is apt to make a wrong decision at a small vestigial phase error, a determining error can be reduced with an adaptive determining region by obtaining the slope at a given number of data.

However, the above-described phase detecting method and phase tracking loop circuit still have a disadvantage in that the digital filter for estimating the Q value should be accurate since the Q value has an important role in detecting the phase error as expressed by the equations (19) and (20). Further, since a construction or algorithm for processing ATAN etc. should be added, the system is complicated.

SUMMARY OF THE INVENTION

It is therefore an object of the present invention to provide a phase detecting method of a digital vestigial sideband modulation communication device which is not sensitive to a Q channel value.

It is another object of the present invention to provide a phase tracking loop circuit which simplifies a hardware construction and is not sensitive to a Q channel value.

It is still another object of the present invention to provide a phase tracking loop circuit to operate by the symbol of an input data channel in a phase detecting method of a digital vestigial sideband modulation communication device.

It is still yet another object of the present invention to provide a phase tracking loop circuit for tracking a phase by the block of an input data channel in a phase detecting method of a digital vestigial sideband modulation communication device.

In accordance with one aspect of the present invention, a phase detecting method of a digital vestigial sideband modulation communication device includes the steps of: digital-filtering I channel data applied from the exterior to restore Q channel data; compensating for a phase of the I and Q channel data by a prescribed phase error value; estimating an I channel level value which approximates the I channel data from the phase-compensated I channel data; and obtaining a difference between the phase-compensated I channel data and the I channel level value, and generating as the phase error value an operation value obtained by multiplying the difference by a sign of the Q channel data.

In accordance with another aspect of the present invention a phase tracking loop circuit of a digital vestigial sideband modulation communication device includes: a digital filter for digital-filtering input I channel data to restore first Q channel data; a delayer for delaying the input I channel data during a filtering time of the digital filter to generate I channel data; a first multiplier for complex-multiplying the I channel data and the first Q channel data by sine and cosine values to generate first I channel data and second Q channel data, respectively; a second multiplier for multiplying the first I channel data by an accumulation limited value and for outputting the second I channel data in which the Q channel filtering imperfections and amplitude distortion are compensated; an estimator for receiving the second Q channel data and the second I channel data from the first and second multipliers, respectively, and generating an I level estimated value which approximates the second I channel data in response to a vestigial phase error; a phase error determiner for receiving the I level estimated value, the second I channel data and the second Q channel data, and determining a phase error value corresponding to a difference between the second I channel data and the I level estimated value according to the direction of the second Q channel data; a first divider for dividing the phase error value by a first divisor to generate the divided value as a phase error value; a sine and cosine table ROM for supplying sine and cosine values corresponding to the phase error value to the first multiplier; a second divider for accumulating the phase error value of a prescribed number and dividing the accumulated value by a second divisor to supply the divided value as a vestigial phase error to the estimator; and an accumulation limiter for receiving the I level estimated value and the second I channel data and supplying as the accumulation limited value a value obtained by subtracting the I level estimated value from the second I channel data to the second multiplier.

BRIEF DESCRIPTION OF THE DRAWINGS

The advantages and features of the present invention will be more apparent from the detailed description hereafter, with reference to the attached drawings, in which.

DETAILED DESCRIPTION OF THE PREFERRED EMBODIMENT

In the following description, the specific details are set forth to provide a more thorough understanding of the present invention. It will be apparent, however, to one skilled in the art, that the present invention may be practiced without these specific details. In other instances, well known features have not been described in detail so as not to obscure the present invention.

Figure 4:
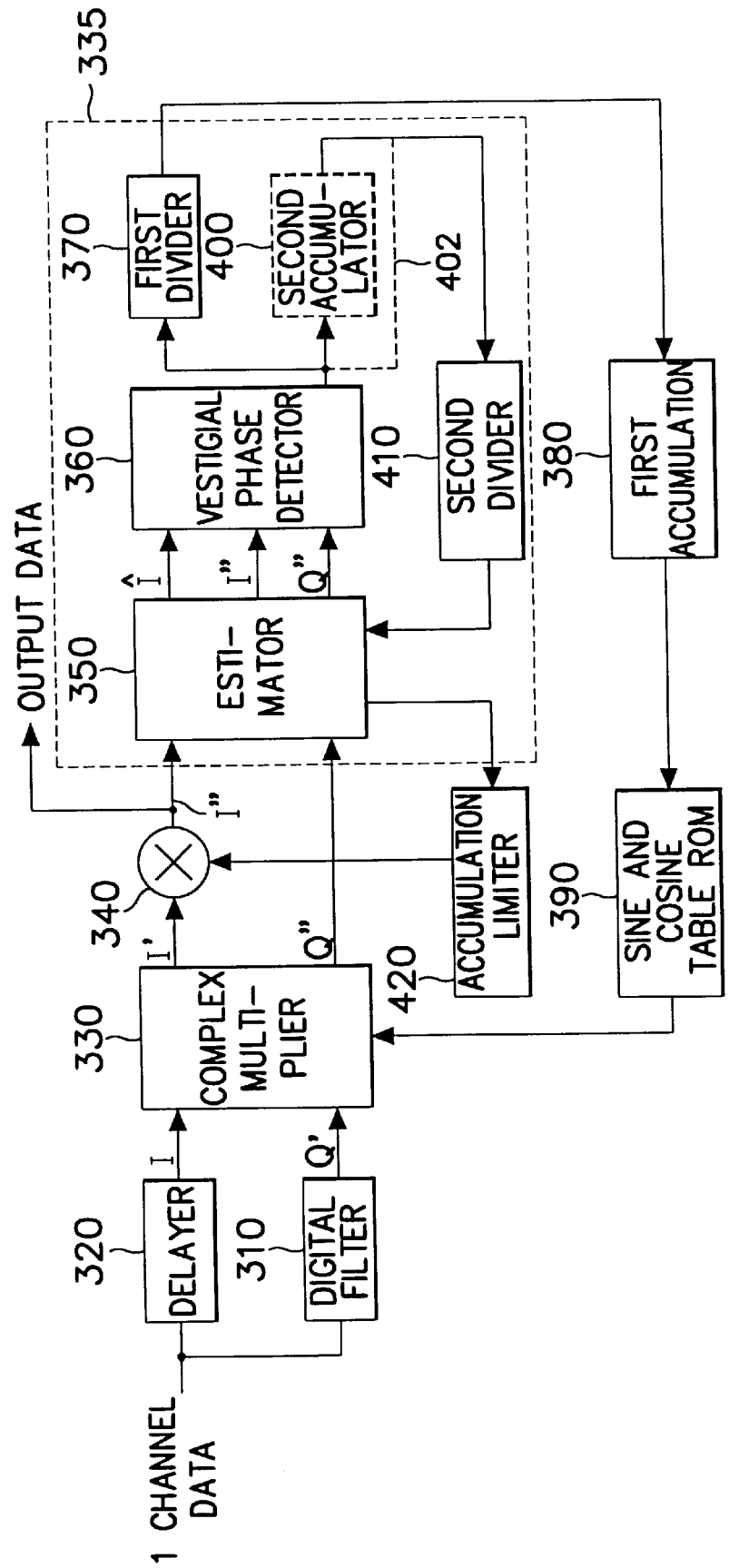
FIG. 4 is a block diagram illustrating a phase tracking loop circuit according to one embodiment of the present invention.

Referring to FIG. 4, a digital filter 310 Hilbert transform filters an input I channel data to generate first Q channel data, for example, Q' channel data, which is different from the I channel data in its phase. A delayer 320 delays the input I channel data during a filtering time of the digital filter 310 to generate delayed I channel data. A complex multiplier 330 complex-multiplies the delayed I channel data generated from the delayer 320 and the Q' channel data generated by the digital filter 310 by sine and cosine values corresponding to a phase error detected by a phase tracking loop to respectively generate phase-compensated first I channel data and second Q channel data, for example, I' channel data and Q" channel data. A multiplier 340 multiplies the I' channel data by an accumulation limited value and compensates for Q channel filtering imperfections and amplitude distortion to generate the second I channel data, for example, the I" channel data. Phase detecting circuit 335 generates an estimated I channel level Î, which approximates the second I channel data I". When generating the estimated I channel level Î, the phase detecting circuit 335 uses a vestigial phase error, which is a proportional value of a vestigial phase value θ. The vestigial phase value θ is obtained by evaluating the approximate I channel level value Î, the I" channel data and the Q" data; and the vestigial phase error is obtained by dividing the vestigial phase value θ by a predetermined value. A first accumulator 380 accumulates the phase error value generated from the phase detecting circuit 335 to generate an accumulated value. A sine and cosine table ROM 390 supplies sine and cosine values corresponding to the accumulated value generated from the first accumulator 380 to the complex multiplier 330. An accumulation limiter 420 receives the vestigial phase error value of the I level value Î and the I" channel data generated from the phase detecting circuit 335 to generate an operation value of (I"−Î) as the accumulation limited value, and limits the accumulation limited value to an approximate value within a preset limited range (for example, 0.8–1.2) when an absolute value of the I" channel data is over a preset level (for example, over 6). In the phase detecting circuit 335, an estimator 350 receives the second Q channel data (that is, the Q" channel data) generated from the complex multiplier 330 and the second I channel data (that is, the I" channel data) generated from the multiplier 340, and estimates the approximate I channel level value Î of the I" channel from the proportional value of the vestigial phase error to generate the approximate I channel level value Î, the I" channel data and the Q" channel data. A vestigial phase detector 360 detects the vestigial phase value θ from the approximate I channel level value Î, the I" channel data and the Q" channel data. A first divider 370 divides the vestigial phase value θ by a first divisor M so that the phase tracking loop may not diverge, to generate the phase error value. A second accumulator 400 accumulates the vestigial phase value θ of N symbols from the vestigial phase detector 360. A second divisor 410 divides the accumulated value of the vestigial phase value θ generated from the second accumulator 400 by a second divisor ($N^{*}R$) and supplies the divided value to the estimator 350 as the vestigial phase error.

In the above description, the second divisor "R" is an adjusted value for adjusting sensitivity of the vestigial phase value θ.

The operation of this embodiment of the present invention will be explained hereinafter with reference to FIG. 4.

Figure 1:
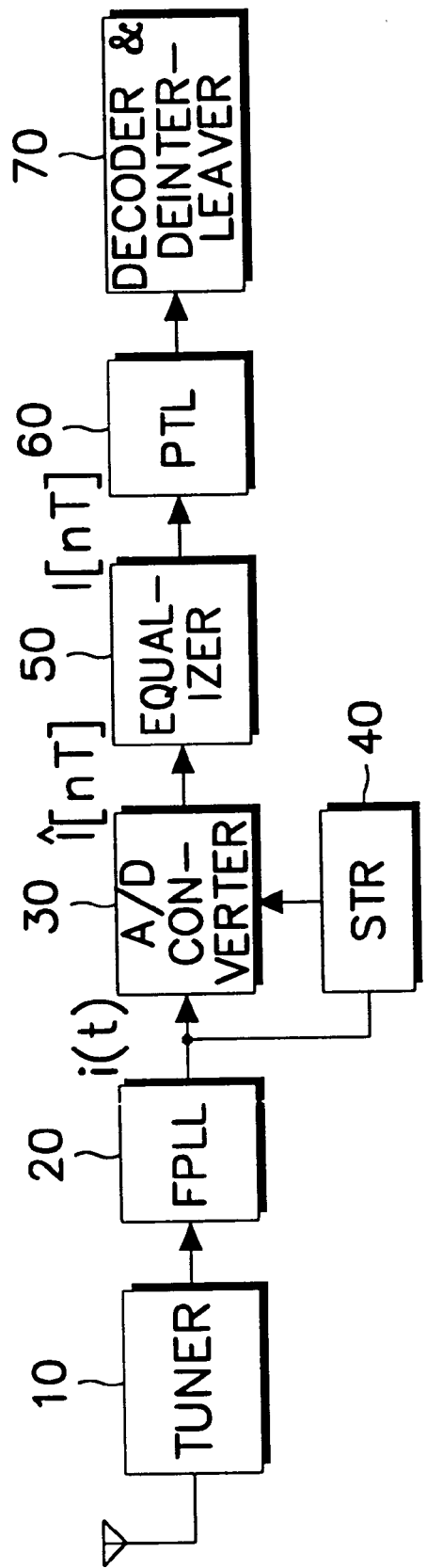
FIG. 1 is a block diagram illustrating a GA-HDTV receiver proposed by the Grand Alliance Committee of the United States (the GA-HDTV Group)
Figure 2:
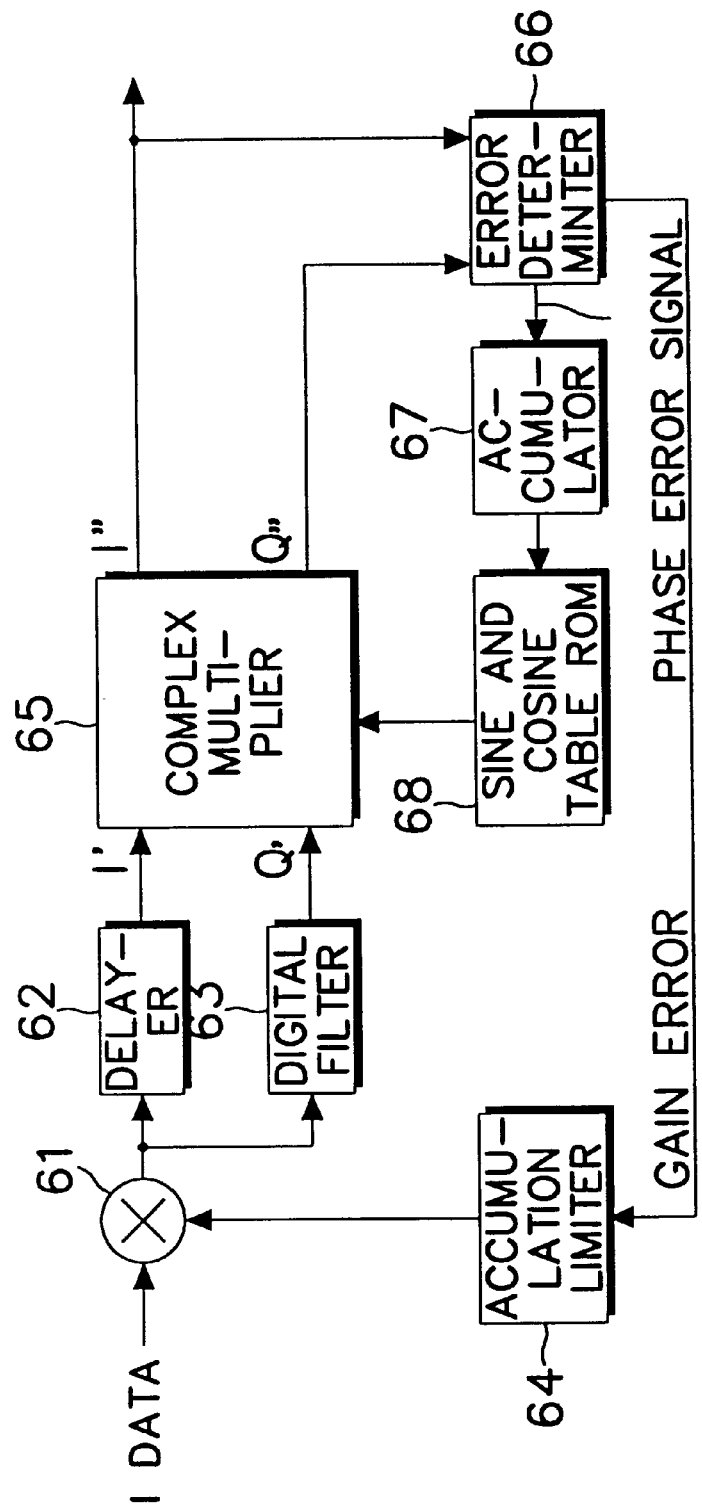
FIG. 2 is a block diagram illustrating a conventional phase tracking loop circuit proposed by the GA-HDTV group.
Figure 3:
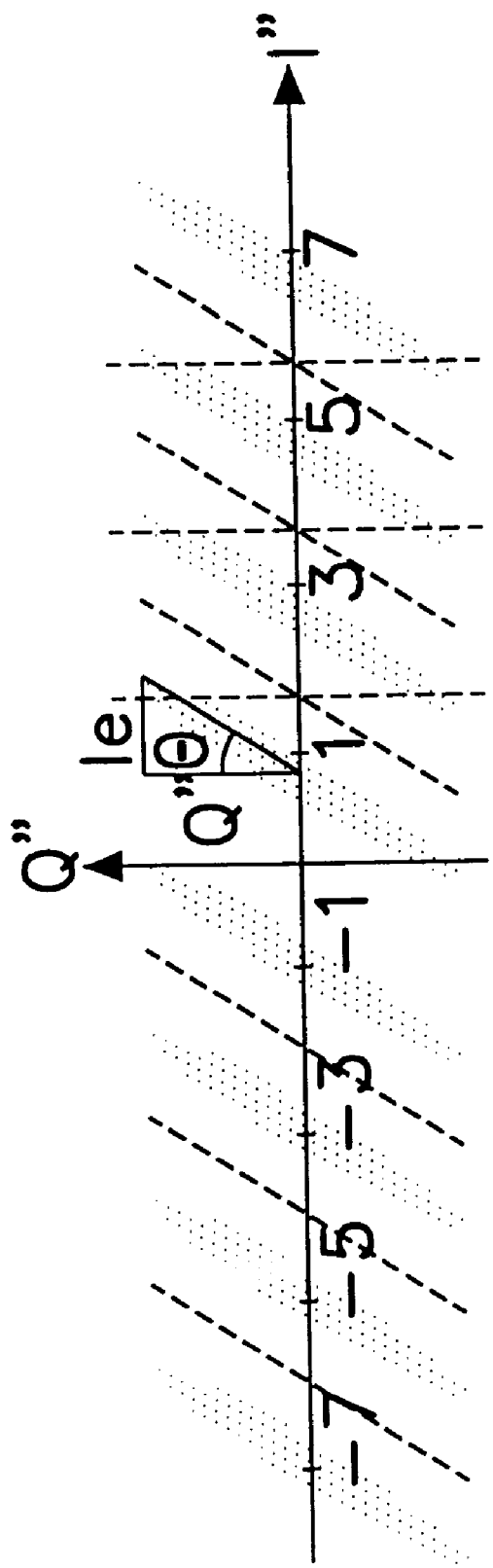
FIG. 3 is a diagram illustrating a scattering line for an input signal of another conventional phase tracking loop circuit of FIG. 2.

Generally, in the GA HDTV, a received signal is demodulated by using the FPLL 20 shown in FIG. 1. In the demodulation step, a vestigial phase component is generated according to a phase error between a received carrier wave and a carrier wave generated from the FPLL 20. The vestigial phase component distorts a demodulating signal generated in the demodulation step. A signal demodulated by the FPLL 20 is converted to a digital signal by a data symbol rate through the A/D converter 30 driven by the STR 40. The converted digital signal is supplied to the phase tracking loop circuit through the equalizer 50.

Since an input signal supplied to the phase tracking loop circuit is only an I channel signal, Q channel information is needed to extract phase information and compensate for a phase error. In order to restore the Q channel signal from the I channel signal, the I channel signal and the digital filter 320 which is a Hilbert transform filter are used. The digital filter 310 Hilbert transform filters the I channel data received from the equalizer 50 to restore the Q' channel data. The delayer 320 delays the I channel data received from the equalizer 50 during the filtering time of the digital filter 310 to generate the delayed I channel data. The complex multiplier 330 of FIG. 4 complex-multiplies the delayed I channel data and the Q' channel data respectively generated from the delayer 320 and the digital filter 310 by the sine and cosine values corresponding to the phase error detected by the phase tracking loop, to generate the phase-compensated I' channel data and Q" channel data, respectively. That is, the complex multiplier 330 compensates a phase through subtraction of the I channel input signal passing through the delayer 320 and the sine and cosine values generated from the phase tracking loop circuit by use of the Q' channel data. The multiplier 340 connected to one output node of the complex multiplier 330 multiplies the I" channel data by the accumulation limited value received from the accumulation limiter 420 to compensate for the Q channel filtering imperfections and amplitude distortion. The compensated I" channel data column is supplied to a decoder and deinterleaver 70 shown in FIG. 1. The estimator 350 within the phase detecting circuit 335 receives the Q" channel data from the complex multiplier 330 and the I" channel data from the multiplier 340, and estimates the approximate I level value Î of the I" channel data from the proportional value of the vestigial phase error to generate the approximate I level value Î, the I" channel data and the Q" channel data. Accordingly, there are outputted the I channel estimation level value, the I" channel data, and the Q" channel data from the estimator 350. The vestigial phase detector 360 detects the vestigial phase value θ from the approximate I level value Î outputted from the estimator 350, the I" channel data and the Q" channel data.

In the preferred embodiment, since the phase detecting method uses only the direction of the Q channel value generated by the Hilbert transform filtering, even if the digital filter is not accurate, there is no effect on the performance. The vestigial phase value is obtained by the following equation (22):

$$\theta = SGN(Q'')(I''-\hat{I}) \quad (22)$$

In the equation (22), the vestigial phase value is obtained only by an error for a decision value of the I channel signal and the direction of the Q" channel data filtered through the digital filter 310. The equation (22) can be simplified by the following equation (23) according to another embodiment of the present invention:

$$\theta = SGN(Q'')SGN(I''-\hat{I}) \qquad (23)$$

Thus, since only the direction of the I" and Q" channel data is used, the hardware construction can be further simplified.

The first divider 370 divides the vestigial phase value obtained by the equation (22) or (23) by a divisor M, 30 for example, so as that the phase tracking loop does not diverge, to generate the phase error value. The first accumulator 380 accumulates the phase error value generated from the first divider 370 to supply the accumulated value to the sine and cosine table ROM 390. The sine and cosine table ROM 390 has the sine and cosine values corresponding to each phase and supplies the sine and cosine values corresponding to the accumulated value generated from the first accumulator 380 to the complex multiplier 330. Meanwhile, the second accumulator 400 receives the vestigial phase value θ from the vestigial phase detector 360. The vestigial phase value θ is multiplied by a gain a ($\alpha \leq 1$) and then added to a previous output value $\theta'_{n-1}$.

$$\theta'_n = \theta'_{n-1} + \alpha \theta_n \qquad (24)$$

$$\alpha = \frac{1}{M}$$

In the equation (24), α is a value related to a bandwidth for phase compensation and is also used for adjusting gain. The second accumulator 400 accumulates the vestigial phase value θ of N symbols from the vestigial phase detector 360 and provides the input value to the second divider 410, as shown in the following equation (25).

$$\text{Output of the second accumulator} = \Sigma(I''-\hat{I}) \qquad (25)$$

The second divider 410 divides the accumulated value generated from the second accumulator 400 by the second divisor (N·R) and supplies the divided value as the vestigial phase error to the estimator 350. As accumulated in the above equation (25), the estimator 350 multiplies the vestigial phase error value divided as the second divisor by a value "−SGN(I")" to provide the vestigial phase error value estimated according to the following expression (26) to the accumulation limiter 420:

$$-SGN(I'')\beta\Sigma(I''-\hat{I}) \qquad (26)$$

where β is $$\frac{1}{N \cdot R}.$$

The accumulation limiter 420 receives the vestigial phase error value of the I level value Î and the I" channel data from the estimator 350 to generate an operation value of (I"−Î) as the accumulation limited value, and limits the accumulation limited value to an approximate value within a limited range (for example, 0.8–1.2) when an absolute value of the I" channel data is over a preset level (for example, over 6). The construction of such a second accumulation limiter 420 will be described with reference to FIG. 5.

Figure 5:
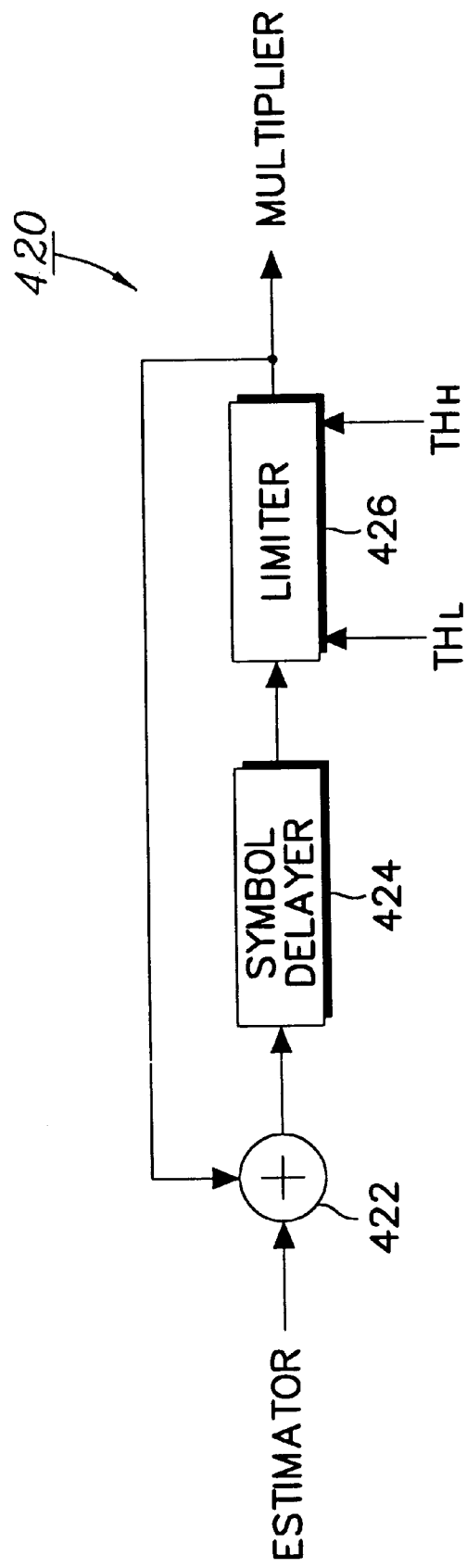
FIG. 5 is a detailed block view according to one embodiment of an accumulation limiter shown in FIG. 4.

FIG. 5 is a detailed block view of the accumulation limiter shown in FIG. 4. Referring to FIG. 5, the estimated vestigial phase value outputted from the estimator 350, as shown in the equation (26), is inputted to one terminal of a third accumulator 422 of FIG. 5. The I channel data whose output level is limited by a limiter 426 is inputted to the other input terminal of the third accumulator 422. The third accumulator 422 accumulates the two input signals and supplies the accumulated output to a symbol delayer 424. The symbol delayer 424 delays the input signal by the unit of symbol to output the signal to the limiter 426. The limiter 426 limits an absolute value of an output I channel data from the symbol delayer 424, i.e., a preset downward threshold value $TH_L$ and a upward threshold value $TH_H$ (for example, the values $TH_L$ and $TH_H$ are established as 0.8 and 1.2, respectively, when the absolute value of the I" channel data is over 6). Then, the limiter 426 provides the value to the multiplier 340. That is, the accumulation limiter 420 limits an accumulation value to an approximate value of the preset value when the absolute value of the I" channel data is at a level of a maximum value, and then outputs the value to the multiplier 340.

In the above description, the direction of the input signal has been mainly used to simplify the hardware construction. However, the vestigial phase value θ can be optimized to the following equation (27) to raise the reliability of the construction under an inferior channel circumstance with impulse noise.

$$\theta'_{n,med} = \theta'_{n-1,med} + med(\theta'_{n-k}, \theta_{n-k-1}, \ldots, \theta_{n-1}, \theta_n) \qquad (27)$$

where "med" is an intermediate value select function, and $\theta_{n,med}$ is a phase error eliminating an isolated point. That is, the phase error values $\theta_{n-k} \sim \theta_n$ of k symbols are obtained by the equation (22) or (23), and the isolated point is eliminated by nonlinear processing as expressed by the equation (27), thereby preventing an abnormal operation of the PTL 60. In the above equation (27), k is an even number. When k is 0, the equation (22) or (23) is satisfied. In the equation (27), $\theta_n$ is the phase error value detected at a current symbol rate.

In the description of the above embodiment of the present invention, the second accumulator 400 accumulates the vestigial phase values θ of N symbols outputted from the vestigial phase detector 360, and then performs processing on a block unit. However, the vestigial phase values can be processed in symbol units as follows.

If the second accumulator 400 shown in FIG. 4 is deleted and the vestigial phase detector 360 is directly connected to the second divider 410 to thereby make a path 402, the data value inputted to the second divider 410 from the vestigial phase detector 360 becomes $\Sigma(I''-\hat{I})$. At the moment, the second divider 410 divides the data $\Sigma(I''-\hat{I})$ by the second divisor N·R and outputs the divided value to the estimator 350 as the vestigial phase error. As mentioned above, if the vestigial phase value is processed by symbol units, the character "N" in the divisor "N·R" must have a value of 1. The estimator 350 multiplies the vestigial phase error divided in the second divider 410 by the value of −SGN(I") to provide the estimated vestigial phase value to the accumulation limiter 420. The estimated vestigial phase value is evaluated according to expression (28):

$$-SGN(I'')\gamma(I''-\hat{I}) \qquad (28)$$

The accumulation limiter 420 accumulate-limits the level of the vestigial phase error value derived according to the expression (28) and provides the value to the multiplier 340, to indicate that the phase tracking is executed by the unit of the symbol.

Figure 6:
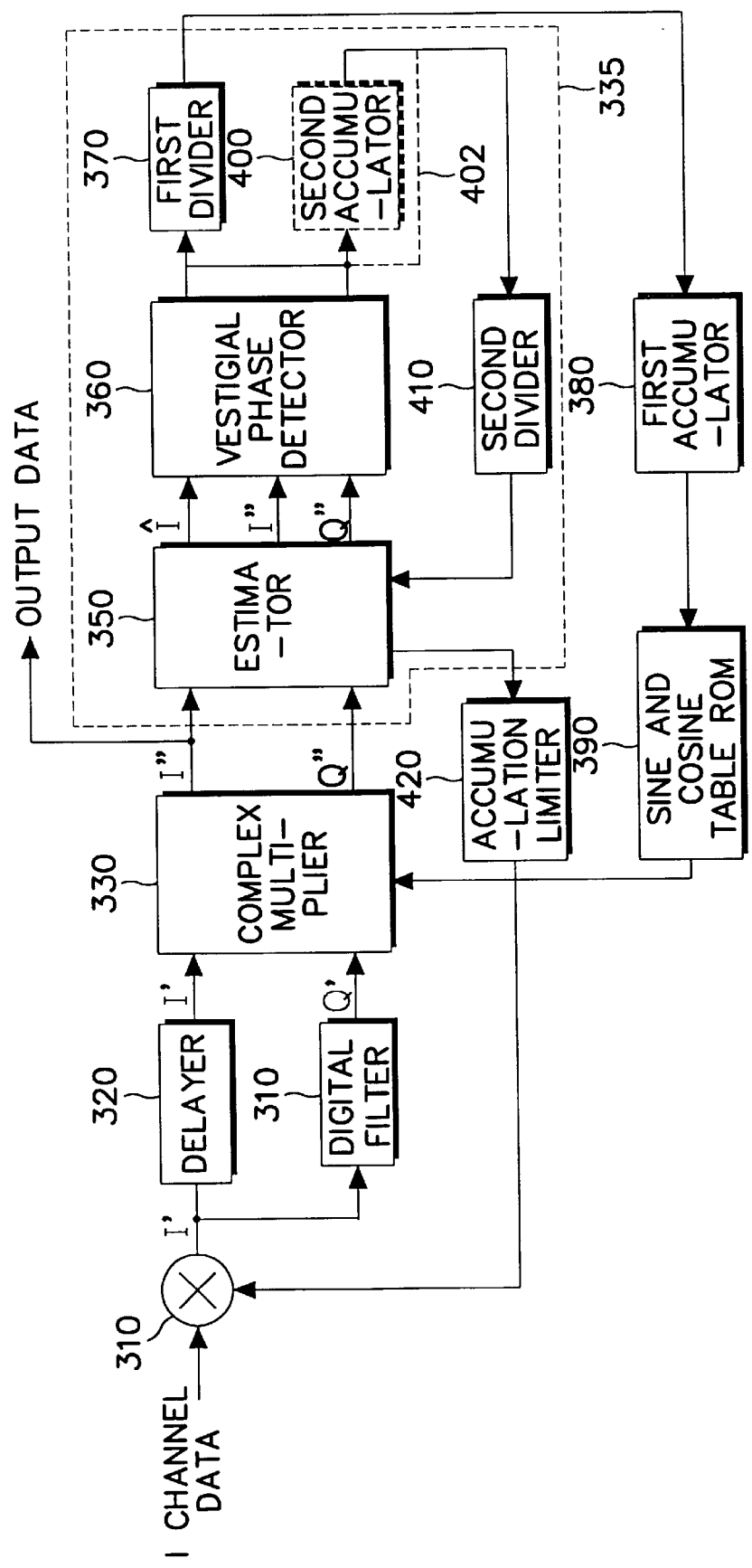
FIG. 6 is a block view of a phase tracking loop circuit according to the other embodiment of the present invention.

FIG. 6 is a block view of a phase tracking loop circuit according to the other embodiment of the present invention. The construction of the device of FIG. 6 is the same as that of FIG. 4, except that the input/output terminal of the multiplier 340 is disposed between the input line of the I channel data and the input terminals of the digital filter 310 and the delayer 320. FIG. 6 is constructed to perform an operation of the phase tracking after gain of the I channel data is adjusted by the output of the accumulation limiter 420. Further, according to the construction of FIG. 6, other values except the sine value are used as gain of the Q channel data.

It should be noted that the vestigial phase value θ which is outputted from the vestigial phase detector 360 according to a selective connection of the second accumulator 400 and the path 402, is processed by block units or symbol units, to thereby perform the operation of phase tracking.

In the above preferred embodiments of the present invention, there have been proposed only the vestigial phase detecting methods using the approximate I channel level value Î, the second I channel data (that is, the I" channel data) and the second Q channel data (that is, the Q" channel data) generated from the estimator 350. However, the phase error detection can be simplified by adding a weight function according to the probability of generating a sign decision error. This is possible because the sign decision reliability of the Q channel value can be regarded as an added weight value. That is, since there is relatively little probability of generating the sign decision error as the Q channel value increases, the weight function related to the Q channel value is introduced to easily detect the phase error. The schematic operation related to the weight function now will be given.

Figure 8:
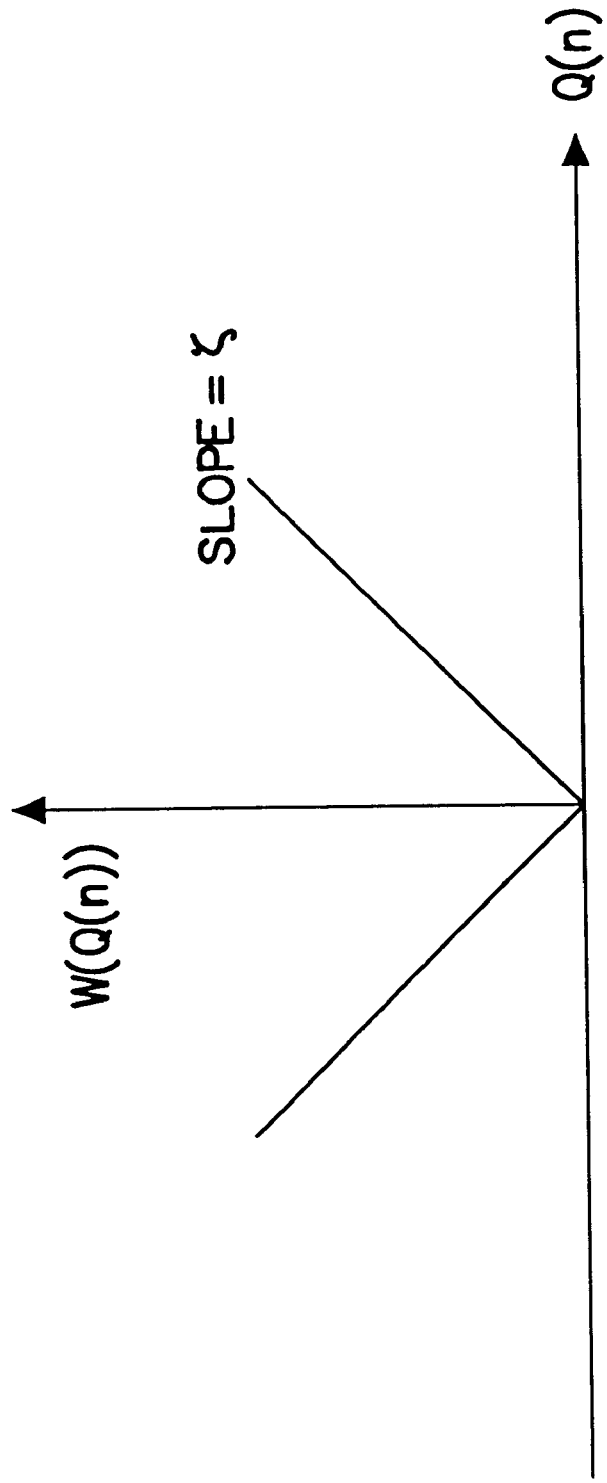
FIG. 8 is a diagram illustrating an example of the weight function according to the present invention.

The weight function can be expressed by the following equation (20):

$$W_\zeta(Q'') = |\zeta Q''| \tag{29}$$

where ζ is a gain adjusting coefficient of the weight function and corresponds to a slope of the weight function shown in FIG. 8. When simplifying the equation (20) by omitting the ATAN function, the following equation (30) can be obtained:

$$\theta \cong \frac{I_e}{Q''} \tag{30}$$

where $I_e = I'' - \hat{I}$.

In the above equation (30), if the phase error adding the weight function whose slope is $|\zeta|$ is Qζ, the phase error $Q_\zeta$ is as follows:

$$\theta_\zeta = W(Q'')\theta = |\zeta Q''| \left| I'' - \frac{\hat{I}}{Q''} \right| \tag{31}$$

$$= |\zeta| SGN(Q'') I_e$$

If a new weight function $S_\zeta$ obtained by adjusting the gain of the weight function in the above equation (31) is defined as the following equation (32), the equation (31) can be given by the following equation (33):

$$S_\zeta(Q'') = \zeta, \text{ IF } Q'' \geq o - \zeta, \text{ otherwise} \tag{32}$$

$$\theta_\zeta = S_\zeta(Q'') I_e \tag{33}$$

It can be understood that the above equation (33) introduces the phase error θ obtained by the equation (31) to $$Q = \frac{1}{\pm \zeta}.$$

Figure 7:
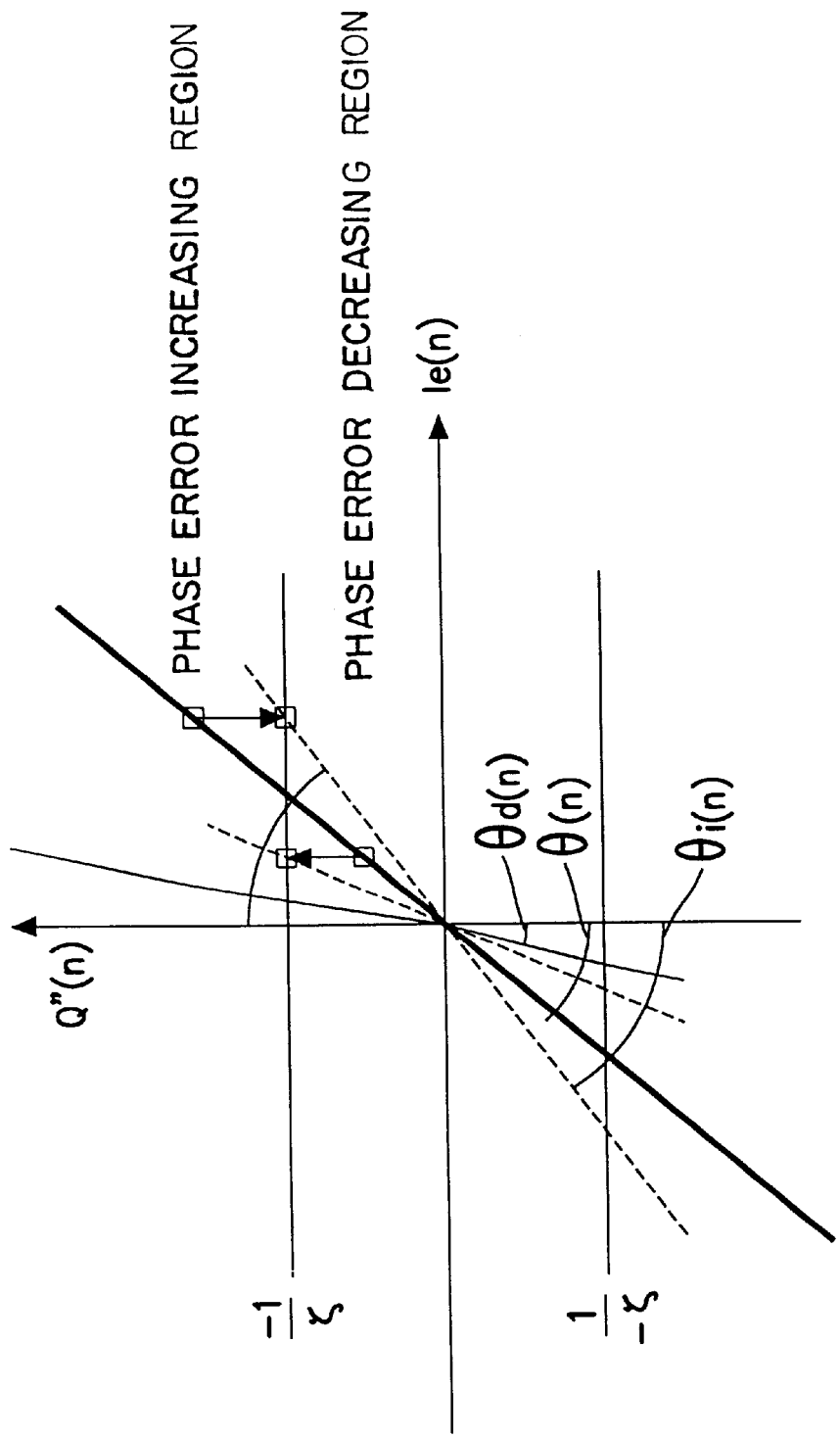
FIG. 7 is a diagram illustrating a phase detecting process using a weight function according to still another embodiment of the present invention.

That is, as shown in FIG. 7, the weighted phase error $\theta_\zeta$ becomes $\theta_d$ when $|Q| \leq \zeta$, and therefore, the weighted phase error $\theta_\zeta$ becomes smaller than the original phase error θ. At other regions, the weighted phase error $\theta_\zeta$ becomes θi which is larger than the original phase error θ.

If the gain adjusting coefficient $|\zeta|\zeta$ is 1, the equation (32) is as follows:

$$S_\zeta(Q'') = SGN(Q'') \tag{34}$$

Therefore, only the sign of the Q channel value is used during the phase detection. The gain adjusting coefficient ζ is a fixed constant. The phase error newly obtained by the gain adjusting coefficient ζ of the weight function is as follows by the equations (31) to (34).

$$\theta_\zeta = |\zeta| S_\zeta(Q'') I_e = |\zeta| \theta 1 \tag{35}$$

Consequently, the operational characteristic of the phase detection performed by the gain adjusting coefficient ζ of the weight function can be represented as indicated in FIG. 7.

As described above, since the phase error is obtained only by the direction without estimating an accurate Q value, the accurate digital filter is not needed. The hardware construction can be simplified by using only the direction of the I and Q values. There is no need to have an ATAN operating circuit or algorithm.

What is claimed is:

1. A phase detecting method of a digital vestigial sideband modulation communication device, comprising the steps of:

digital-filtering an I channel data applied from the exterior to restore a Q channel data;

compensating for a phase of said I channel data and said Q channel data by a prescribed phase error value;

estimating an I channel level value which approximates said I channel data from the phase-compensated I channel data; and calculating a difference between said phase-compensated I channel data and the estimated I channel level value, and generating as a prescribed phase error value an operation value obtained by multiplying said difference by a weight function related to a value of said Q channel data.

2. The phase detecting method as claimed in claim 1, further comprising the step of:

receiving said prescribed phase error value to generate a phase error value eliminating an isolated point by nonlinear processing according to the following equation:

$$\theta'_{n,med} = \theta'_{n-1,med} + med\ (\theta'_{n-k}, \theta_{n-k-1}, \ldots, \theta_{n-1}, \theta_n) \tag{1}$$

where $\theta'_{n,med}[2]$ is a phase error value eliminating an isolated point, $\theta_n$ is the phase error value detected at a current symbol rate, and k is an arbitrary constant.

3. A phase detecting method of a digital vestigial sideband modulation communication device, comprising the steps of:

digital-filtering an input I channel data to generate a first Q channel data which is different from said input I channel data in its phase;

delaying said input I channel data to generate a first I channel data;

complex-multiplying said first I channel data by a sine value corresponding to an accumulated phase error value to generate a phase-compensated second I channel data and complex-multiplying said first Q channel data by a cosine value corresponding to the accumulated phase error value, to generate a phase-compensated second Q channel data; and calculating an I level estimated value by subtracting said phase-compensated second I channel data from said first I channel data, determining a phase error value according to the following equation, and accumulating said phase error value:

$$\theta_\zeta = S_\zeta(Q'')I_e$$

where $\theta_\zeta$ is the phase error value, $S_\zeta$ is a gain-adjusted weight function, Q" is the second Q channel data, and $I_e$ is a value obtained by subtracting the I level estimated value from the phase compensated second I channel data.

4. The phase detecting method as claimed in claim 3, wherein said weight function is set according to said second Q channel data as follows:

$$S\zeta(Q'') = \begin{cases} \zeta, & \text{if } Q'' \geq o \\ -\zeta, & \text{otherwise} \end{cases}$$

where $\zeta$ is a gain adjusting coefficient of the weight function.

* * * * *